(12) United States Patent
Lienert et al.

(10) Patent No.: US 9,160,080 B2
(45) Date of Patent: Oct. 13, 2015

(54) ELECTRIC CABLE, METHOD FOR PRODUCING AN ELECTRIC CABLE, AND WELDING DEVICE FOR PRODUCING AN ELECTRIC CABLE

(71) Applicant: Auto-Kabel Management GmbH, Hausen i.W. (DE)

(72) Inventors: Andreas Lienert, Mönchengladbach (DE); Sebastian Martens, Straelen (DE)

(73) Assignee: Auto-Kabel Management GmbH, Hausen i. W. (DE)

( * ) Notice: Subject to any disclaimer, the term of this patent is extended or adjusted under 35 U.S.C. 154(b) by 0 days.

(21) Appl. No.: 14/369,929

(22) PCT Filed: Nov. 30, 2012

(86) PCT No.: PCT/EP2012/074065
§ 371 (c)(1),
(2) Date: Jun. 30, 2014

(87) PCT Pub. No.: WO2013/102522
PCT Pub. Date: Jul. 11, 2013

(65) Prior Publication Data
US 2014/0326501 A1      Nov. 6, 2014

(30) Foreign Application Priority Data
Jan. 6, 2012   (DE) .................. 10 2012 000 137

(51) Int. Cl.
*H01R 9/05*    (2006.01)
*H01R 4/02*    (2006.01)
(Continued)

(52) U.S. Cl.
CPC .. *H01R 4/02* (2013.01); *H01B 1/00* (2013.01); *H01B 1/023* (2013.01); *H01B 1/026* (2013.01);
(Continued)

(58) Field of Classification Search
CPC ........................................................ H01R 9/05
USPC ............... 174/75 C, 78; 439/98, 99, 578, 585
See application file for complete search history.

(56) References Cited

U.S. PATENT DOCUMENTS 2,777,894 A * 1/1957 Arbeiter et al. ............. 174/75 C
3,076,169 A * 1/1963 Blaisdell ..................... 439/322
(Continued)

FOREIGN PATENT DOCUMENTS

DE    3342996    6/1984    .......... H01R 13/512
DE    29813964   12/1998   ............... B06B 1/02
(Continued)

OTHER PUBLICATIONS

International Searching Authority, International Search Report—International Application No. PCT/EP2012/074065, dated Apr. 25, 2013, together with the Written Opinion of the International Searching Authority, 11 pages.
(Continued)

*Primary Examiner* — Chau N Nguyen
(74) *Attorney, Agent, or Firm* — Sunstein Kann Murphy & Timbers LLP

(57) ABSTRACT

Electric cable 16 having an inner conductor 16a, a primary isolation 16b surrounding the inner conductor 16a, an electric shield 18 surrounding the primary isolation 16b, and a secondary isolation 16c surrounding the shield, wherein at least at one end 22 of the cable 16 the secondary isolation 16c is removed so that the shield 18 is stripped. A contacting of the shield to a vehicle body is electrically and mechanically ensured in that a sleeve 2 is pushed over the stripped shield 18, in that a part of the shield 18 protruding beyond the sleeve 2 in the direction of the end 22 of the cable 16 is put over the sleeve 2, and in that the part of the shield 18 that is put over the sleeve 2 is intermetallically connected to the sleeve 2.

13 Claims, 3 Drawing Sheets

(51) Int. Cl.
*H01R 4/62* (2006.01)
*H01R 43/02* (2006.01)
*H01B 1/00* (2006.01)
*H01B 1/02* (2006.01)
*H01R 4/66* (2006.01)
*B26D 7/08* (2006.01)
*H01R 13/648* (2006.01)
*H01R 101/00* (2006.01)
*B26D 3/16* (2006.01)

(52) U.S. Cl.
CPC .................. *H01R 4/625* (2013.01); *H01R 4/66* (2013.01); *H01R 9/0512* (2013.01); *H01R 43/0207* (2013.01); *H01R 43/0214* (2013.01); *B23K 2201/38* (2013.01); *B26D 3/166* (2013.01); *B26D 7/086* (2013.01); *H01R 13/648* (2013.01); *H01R 2101/00* (2013.01); *H01R 2201/26* (2013.01)

(56) References Cited

U.S. PATENT DOCUMENTS

| | | | | |
|---|---|---|---|---|
| 3,539,709 A | * | 11/1970 | Brancaleone | 174/75 C |
| 4,280,749 A | * | 7/1981 | Hemmer | 439/578 |
| 4,963,104 A | | 10/1990 | Dickie | 439/460 |
| 5,967,855 A | * | 10/1999 | Asakura et al. | 439/681 |
| 6,322,390 B1 | * | 11/2001 | Takeuchi | 439/578 |
| 6,700,065 B2 | * | 3/2004 | Karlsson | 174/74 R |
| 7,084,346 B2 | * | 8/2006 | Pabst | 174/74 R |
| 2009/0133925 A1 | | 5/2009 | Albert et al. | 174/72 A |
| 2013/0337705 A1 | * | 12/2013 | Kalayjian et al. | 439/889 |

FOREIGN PATENT DOCUMENTS

| | | | | |
|---|---|---|---|---|
| DE | 10260897 | | 7/2004 | ............ H01R 43/02 |
| DE | 102007051836 | | 5/2009 | ............ H01R 4/66 |
| EP | 1466709 | | 10/2004 | ............ B26D 7/08 |
| JP | 2000-32626 | | 1/2000 | ............ H02G 1/14 |
| WO | WO 97/04500 | | 2/1997 | ............ H01R 9/05 |
| WO | WO 2011/152415 | | 12/2011 | ........... H01R 13/655 |

OTHER PUBLICATIONS

German Patent Office, Office Action, Application No. 102012000137.1, dated Oct. 16, 2012, 5 pages.

* cited by examiner

ELECTRIC CABLE, METHOD FOR PRODUCING AN ELECTRIC CABLE, AND WELDING DEVICE FOR PRODUCING AN ELECTRIC CABLE

The subject matter relates to an electric cable and to a method for producing an electric cable and also to a welding device for producing an electric cable. In particular, the subject matter relates to the possibility of contacting electric shields in high-voltage cables, in particular in high-voltage cables in the hybrid or electric vehicle sector.

The electrification of motor vehicles requires a large number of high-voltage leads in comparison to conventional vehicles comprising combustion engines. Said high-voltage leads connect in particular batteries to electric motors and carry voltages of 100 V and more. In situations where 12 V leads have been used to date, there was no need for electric shields. This is not the case with high-voltage leads since, due to the voltages, there is a fear of affecting adjacent electrical or electronic components by electromagnetic radiation. For this reason, an electric shield must surround the entire cable. At its ends, the electric shield must be able to be reliably connected to the vehicle body. In doing so, it must be ensured that the contacting of the shield to the vehicle body satisfies all electrical requirements and is mechanically stable. Particularly when crimping shields to connection pieces, excessively high compression may lead to sheared shield wires and insufficient contacting. If the compression is too low, this may lead to insufficient contacting. Both insufficient contacting and sheared shield wires affect the electrical contacting of the shield braid to the vehicle body, resulting in high transfer resistances. Moreover, a defective contacting may make the shield electromagnetically insufficient. Finally, it must be ensured that the shield itself does not come into contact with other voltage-carrying parts during operation, thereby causing faults.

For this reason, the problem addressed by the subject matter was that of providing an electric cable and a method for producing an electric cable, which allows a reliable electromagnetic shielding by an electrical contacting of a shield of an inner conductor.

This problem is solved by an electric cable according to claim 1 and a method according to claim 7. In addition, a welding device according to claim 11 serves for producing such an electric cable having the aforementioned properties.

In order to contact the shield of an electric cable to a shield transition, it is proposed that a sleeve is pushed over the stripped shield of the cable. The sleeve is pushed so far over the cable that, once the sleeve has been pushed into its end position, a part of the shield protrudes out from the sleeve towards the end of the cable. Then, this part of the shield that protrudes beyond the end of the sleeve towards the end of the cable is folded back or put over the sleeve. The part of the shield that has thus been put over the sleeve is then intermetallically connected to the sleeve. An intermetallic connection may preferably be a material connection between the sleeve and the shield.

Preferably, the sleeve is adapted in terms of its external diameter to a conventional shield connection (shield transition, connection bushing, etc.), so that the sleeve can readily be inserted into the shield connection and thus an electrical connection between the shield and the shield connection is permitted via the sleeve.

In addition, the sleeve is preferably made from a non-ferrous metal or alloys thereof. In particular, the sleeve may be formed from copper or alloys thereof or aluminium or alloys thereof. The shield is preferably made from copper. In this case, the sleeve is likewise preferably be made from copper. On the other hand, particularly in order to save weight, aluminium may be used as the material for the shield. When using aluminium, however, non-conductive aluminium oxide layers form on the surface of the shield. It is preferably proposed that the sleeve is particularly in this case made from aluminium or alloys thereof, since contact corrosion will thus be avoided.

By using the sleeve, it is possible to reliably contact the shield to a shield transition, for example a plug-in connection. In this case, it is ensured that the entire shield is reliably contacted, electrically and also mechanically, to the shield connection by means of the sleeve.

According to one embodiment, the shield is a metal braid, a metal foil or a combination of both. Both a metal braid and a metal foil are flexible such as to be able to be folded back over the sleeve as soon as the sleeve has been pushed beyond the end of the cable. The braid or foil can then be materially connected to the sleeve. The connection of the shield to the sleeve preferably takes place in a region of the sleeve facing towards the end of the cable.

As already explained, the material connection between the sleeve and the shield is limited to preferably only a part of the sleeve. This part of the sleeve which carries the intermetallic connection between the sleeve and the shield preferably faces towards the end of the cable. In order to make it easier to push the sleeve into a bushing, for example the bushing of a shield transition, and at the same time to ensure a reliable electrical contacting of the sleeve to the bushing, it is advantageous if the sleeve has a uniform diameter and/or circumference and/or cross-section both in the region of the intermetallic connection to the shield and in all other regions. For this reason, it is proposed that the sleeve has a step-like offset. This step-like offset is preferably such that a first region of the sleeve has a first diameter and/or circumference and a second region of the sleeve has a smaller diameter and/or circumference. This second region preferably faces towards the end of the cable when the sleeve has been pushed onto the cable. By virtue of this offset, it is possible even in the assembled state to obtain a substantially uniform cross-section of the sleeve provided with the shield. It is possible to prevent the folded-back part of the shield from protruding out from the outer circumference of the sleeve.

The sleeve preferably also has a circumferential groove or a circumferential undercut. These serve preferably for cutting off the overlapping shield. In particular, the circumferential groove or the undercut is arranged in the region of the offset. Preferably, the circumferential groove or the undercut is arranged directly at the offset, in particular at the transition between the first circumference and the second circumference.

According to one advantageous embodiment, it is proposed that the part of the shield that is folded back over the sleeve bears against the sleeve at least in the region of the second diameter and is intermetallically connected preferably to the sleeve preferably in the region of the second diameter.

As already mentioned, the shield is connected to the sleeve preferably in the region of the second circumference. The increase in size of the circumference brought about by the folding-back of the shield in this region of the sleeve is compensated by the fact that the second circumference is smaller than the first circumference. As a result, it can be ensured that the maximum circumference of the sleeve together with the shield is ensured by the first circumference. This first circumference is preferably adapted to the circumference of a shield pick-up, in particular a bushing of a shield pick-up, so that the end of the cable can be reliably electrically contacted to the shield pick-up by means of the sleeve. Preferably, the shield is intermetallically connected to the sleeve in the region of the second circumference. Preferably, the shield is intermetallically, in particular materially, connected to the sleeve only in the region of the second diameter.

In order to prevent parts of the shield from protruding out from the circumference of the sleeve, it is proposed that the folded-back part of the shield is cut to length. This cutting to length preferably takes place in the region of the groove. If the groove is arranged in the region of the transition between the first and second circumference, it is ensured that the shield bears against the sleeve in the region of the second circumference and is cut to length only at the end of this part.

According to one embodiment, it is proposed that the part of the shield that is folded back over the sleeve is intermetallically, in particular materially, connected to the sleeve at least in the region of the second circumference by means of friction welding, resistance welding or ultrasonic welding, in particular by means of ultrasonic roll seam welding or resistance roll seam welding. By means of ultrasonic welding, it is possible in a particularly easy manner to connect the shield to the sleeve. Particularly when using a shield braid, in particular when using an aluminium shield braid, ultrasonic welding ensures that the aluminium oxide layer is chipped off from the shield and the sleeve prior to welding and then a clean contacting of the shield and sleeve is ensured.

As already mentioned, a method for producing an electric cable is also claimed. In said method, after a secondary isolation has been removed and the shield is thus exposed, a sleeve is preferably first pushed over the stripped shield. The sleeve is preferably pushed so far over the stripped shield until the shield protrudes beyond the sleeve at the end of the sleeve pointing towards the end of the cable. In particular, the secondary isolation is removed over a length which is greater than the length of the sleeve. The sleeve can then be pushed so far over the end of the cable until it butts against the secondary isolation, or partially protrudes over the latter. In this end position, the end of the cable together with the shield protrudes beyond the sleeve on the other side of the sleeve. This projecting part protruding beyond the sleeve can then be folded back and placed over the sleeve.

Finally, it is proposed that this folded-back part of the shield is intermetallically connected to the sleeve. This intermetallic connection is preferably a material connection between the shield and the sleeve.

According to one embodiment, it is proposed that the shield is intermetallically connected to the sleeve by means of ultrasonic welding. When ultrasonic welding is used, it is possible in particular for aluminium shields and aluminium sleeves to be reliably electrically welded to one another.

During the welding, a relative movement between a sonotrode and the sleeve along an arc of a circle may be advantageous. It is possible that the sonotrode is arranged in a stationary manner and the sleeve together with the lead is guided in an orbital fashion around the sonotrode. In this case, the sonotrode can rotate about its longitudinal axis. It is also possible that the sonotrode is stationary and the sleeve together with the lead is likewise stationary, but is rotated about its own longitudinal axis. This also makes it possible to produce a welding of the sleeve to the shield along an arc of a circle. In this case, too, the sonotrode can once again be rotated about its own longitudinal axis.

Finally, it is also possible that the lead together with the sleeve is stationary and only the sonotrode is guided in an orbital fashion around the lead.

It is also conceivable that two or more sonotrodes are arranged at angular spacings from one another, preferably equidistant angular spacings, around the sleeve or lead and in each case are guided only along an arc of a circle around the cable.

It is also possible that, during the welding and in a single working step, the welding head is guided around the sleeve such that it simultaneously welds the sleeve to the shield and cuts the shield to length. This may preferably take place by cutting the shield along the sleeve.

Also proposed is a welding device for intermetallically connecting the sleeve to the shield. This welding device has an ultrasonic sonotrode which is mounted such as to be able to pivot or rotate about its longitudinal axis. By means of this ultrasonic sonotrode, on the one hand the shield is intermetallically connected to the sleeve. At the same time, the ultrasonic sonotrode can cut the shield to length at the same time as welding the sleeve to the shield. For this reason, the ultrasonic sonotrode has a profile that is corrugated in longitudinal section. This corrugated profile serves for intermetallically connecting the shield to the sleeve. On the other hand, the ultrasonic sonotrode has a cutting blade at one end. This cutting blade may be shaped in such a way that it engages in the groove running around the sleeve and in so doing cuts the shield to length.

It is preferred if the ultrasonic sonotrode oscillates parallel to the longitudinal axis during the welding process and in so doing intermetallically connects the shield and the sleeve to one another.

The previously described features can be freely combined with one another. The features described above and also those claimed in the dependent and independent claims can be freely combined with one another and in so doing can at the same time be inventive. In particular, the combination of the described features may be inventive when bypassing some or all features of the independent claims.

The subject matter will be explained in more detail below with reference to a drawing which shows examples of embodiments.

Figure 3:
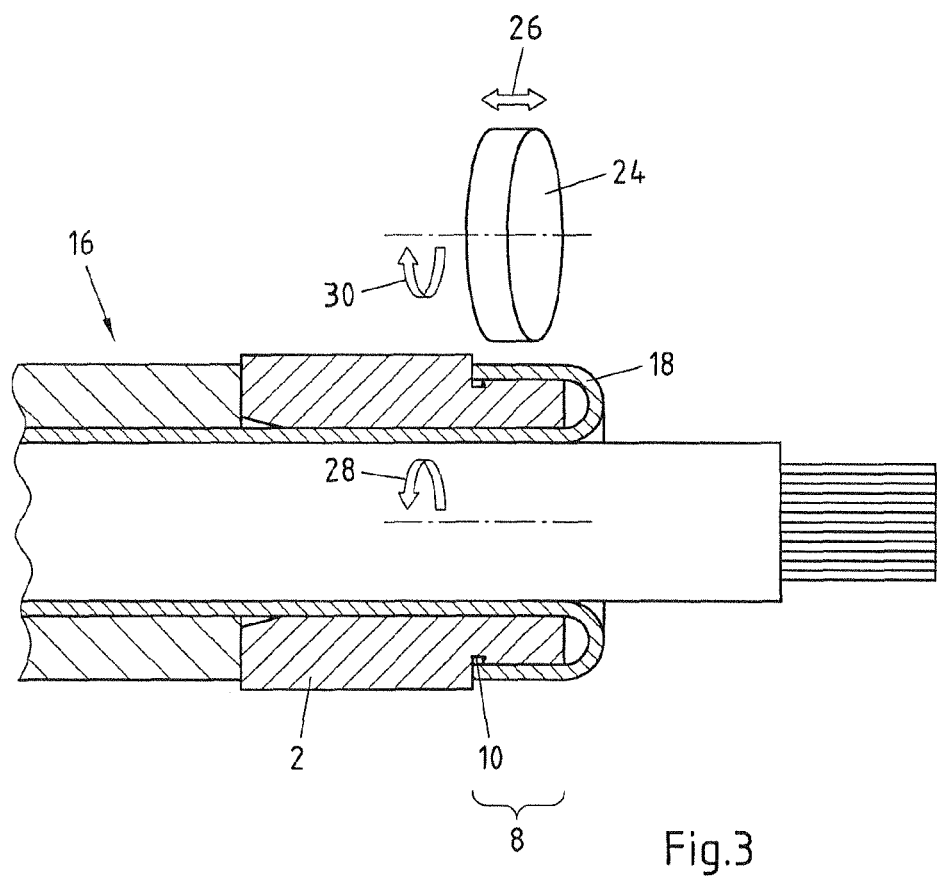
Figure 4:
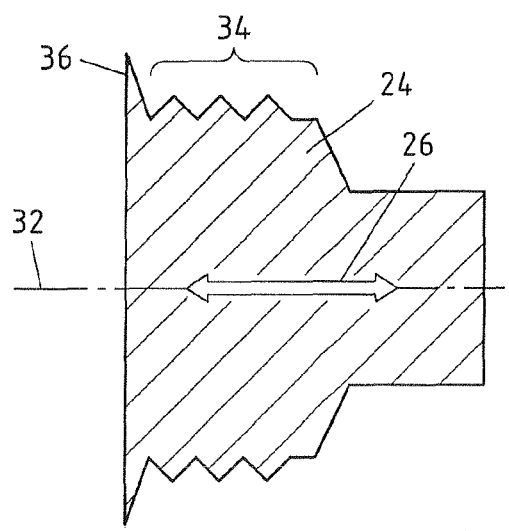
Figure 5A:
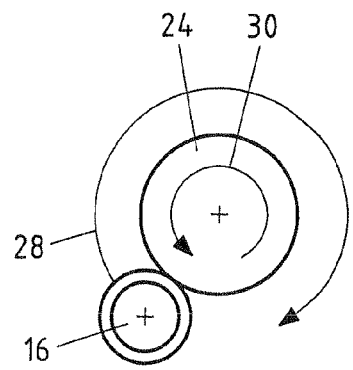
Figure 5B:
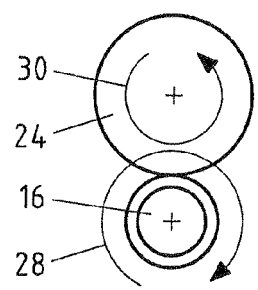
Figure 5C:
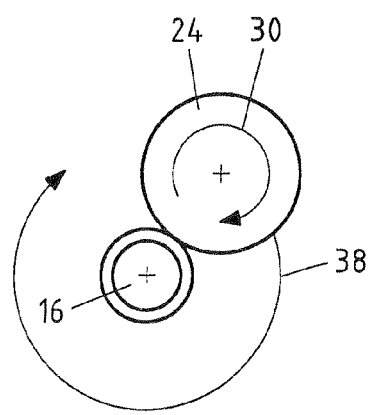

FIG. 3 schematically shows a view of a welding process;

FIG. 4 shows a detail view of a welding head;

FIGS. 5a-c show different possibilities for welding by means of an orbital movement between the sonotrode and the sleeve.

Figure 1:
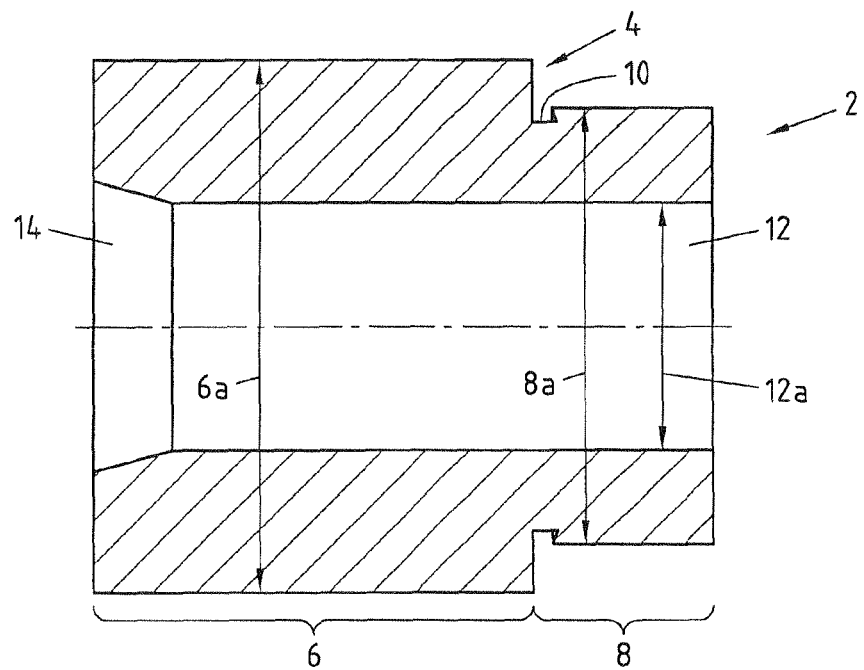
FIG. 1 shows a longitudinal section through a sleeve.

FIG. 1 shows a sleeve 2 having an offset 4. The offset 4 divides the sleeve into a first region 6 and a second region 8. The first region 6 has a first diameter 6a. The second region 8 has a second diameter 8a. A circumferential groove 10 can be seen in the region of the offset 4 between the first region 6 and the second region 8.

The sleeve 2 has a through-opening 12 for receiving a cable having an inner conductor, a primary isolation and a shield. The diameter 12a of the through-opening 12 preferably corresponds substantially to the diameter of an electric cable together with shield, but without secondary isolation.

It is also possible to see that the through-opening 12 is chamfered at one end. The chamfer 14 makes it possible to push the sleeve 2 particularly easily over the cable.

The first diameter 6a preferably corresponds to a diameter of a shield connection. The diameter 6a preferably corresponds to the internal diameter of a press fitting for crimping the sleeve 2 to a shield transition.

Figure 2:
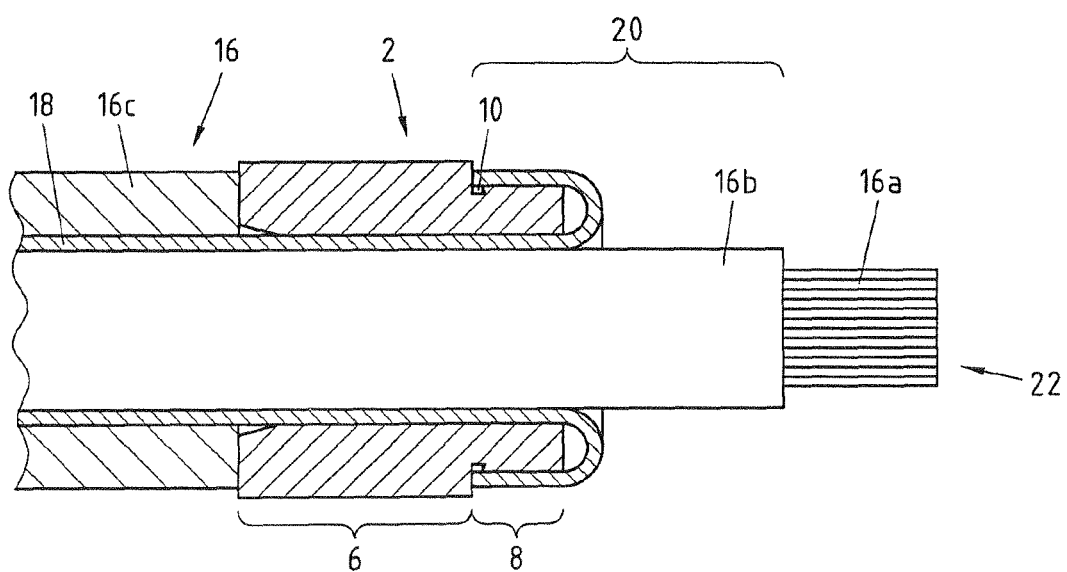
FIG. 2 shows a longitudinal section through a cable with a sleeve.

FIG. 2 shows the sleeve 2, which has already been pushed onto an electric cable 16. The electric cable 16 is formed by an inner conductor 16a, a primary isolation 16b isolating the inner conductor 16a, and a shield 18 surrounding the primary isolation 16b. The shield 18 is isolated by a secondary isolation 16c. The primary isolation 16b and the secondary isolation 16c may be made from plastic, in particular an insulating plastic, for example PVC, polyamide or silicone.

The inner conductor 16a may be formed from aluminium or copper and from respective alloys thereof.

The shield 18 may be a metal braid or a metal foil. It is also possible that a foil and a braid act in combination as the shield 18. The shield 18 may be formed from aluminium or copper or a respective alloy thereof. Preferably, the shield 18 is made from the same material as the inner conductor 16a.

It can be seen that the cable 16 is stripped in a region 20 so that the secondary isolation 16c is removed. The region 20 points towards the end 22 of the cable 16.

The shield 18 is exposed in the region 20. It can also be seen that the sleeve 2 shown in FIG. 1 is pushed over the exposed shield 18. The sleeve 2 is pushed onto the cable 16 in the region 20 until it butts against the secondary isolation 16c. The length of the sleeve 2 is shorter than the length of the region 20, so that a region pointing towards the end 22 of the cable 16 protrudes beyond the sleeve 2 and the shield 18 is exposed at that point. As shown in FIG. 2, the exposed region of the shield 18 is folded back over the sleeve 2 so that the shield 18 rests on the sleeve 2 in the second region 8. The sleeve 2 is then welded to the shield 18 in the second region 8, wherein at the same time the part of the shield 18 pointing towards the first region 6 is cut to length in the region of the circumferential groove 10. This prevents the shield 18 from protruding beyond the second region 8.

A welding process is shown in FIG. 3. FIG. 3 shows the cable 16 shown in FIG. 2 with the sleeve 2 shown in FIG. 1. Once the shield 18 has been folded back over the sleeve 2 in the region of the second region 8, the cable 16 is guided past a roll seam welding head 24. The roll seam welding head 24 is pressed against the shield 18 in the second region 8. The roll seam welding head 24 is then caused to oscillate ultrasonically in the oscillation direction 26. The cable 16 is rotated about its longitudinal axis in the direction of rotation 28 below the roll seam welding head 24. At the same time, the roll seam welding head 24 is rotated in the direction of rotation 30. At least during one turn of the cable 16 through 360°, the roll seam welding head 24 is pressed onto the shield 18 in the region 8 and the shield 18 is welded to the sleeve 2 in the second region 8 by means of the ultrasonic oscillation in the oscillation direction 26. During the welding, the shield 18 is cut to length in the region of the groove 10 by a cutting blade on the roll seam welding head 24.

FIG. 4 shows a profile of a roll seam welding head 24 in the longitudinal direction 32. It can be seen that the roll seam welding head 24 has a corrugated region 34. This corrugated region 34 may be zigzag-shaped or the like. The corrugated region 34 is pressed onto the shield 18 during the welding process and the roll seam welding head 24 is made to oscillate in the oscillation direction 26. During the welding process, the roll seam welding head 24 is moved around the circumferential direction of the cable 16 or sleeve 2. During this, a cutting blade 36 arranged at the end of the roll seam welding head 24 engages in the groove 10. By means of the cutting blade 36, the shield 18 is cut in the region of the groove 10. This produces a clean cut of the shield 18 in the region of the groove 10.

FIGS. 5a-c show various relative movements between the cable 16 and the roll seam welding head 24. It can be seen in FIG. 5a that the roll seam welding head 24 is stationary and is rotated about its longitudinal axis in the direction of rotation 30. At the same time, the cable 16 is guided in an orbital fashion around the longitudinal axis of the roll seam welding head 24 in the direction of rotation 28.

FIG. 5b shows a further welding possibility, in which the roll seam welding head 24 is stationary and is rotated about its longitudinal axis in the direction of rotation 30. The cable 16 is likewise stationary and is rotated about its longitudinal axis in the direction of rotation 28. As a result, a welding of the shield 18 to the sleeve 2 around the entire circumference is likewise possible.

FIG. 5c shows a further welding possibility. In this case, the cable 16 is stationary. The roll seam welding head 24 is on the one hand rotated about its own axis in the direction of rotation 30 and at the same time is guided in an orbital fashion around the longitudinal axis of the cable 16 in the direction of rotation 38.

By means of the illustrated method and the illustrated welding device, it is possible reliably to provide a cable end with a sleeve, wherein the sleeve facilitates a contacting to a shield of the cable.

The invention claimed is:

1. Electric cable comprising:
    an inner conductor,
    a primary isolation surrounding the inner conductor,
    an electric shield surrounding the primary isolation, and
    a secondary isolation surrounding the shield,
    wherein at least at one end of the cable the secondary isolation is removed so that the shield is stripped,
    a sleeve is pushed over the stripped shield,
    a part of the shield protruding beyond the sleeve in the direction of the end is folded back over the sleeve, wherein the sleeve has a circumferential radially accessible groove as well as a step-like offset such that the sleeve has a first diameter at a first side and a second, smaller diameter than the first diameter at a second side facing towards the end of the cable
    in that the part of the shield that is put over the sleeve is intermetallically connected to the sleeve.

2. Cable according to claim 1, wherein the shield is a metal braid or a metal foil and/or in that the shield is formed from a non-ferrous metal or alloys thereof.

3. Cable according to claim 2, wherein the shield is formed from copper or alloys thereof or aluminium or alloys thereof.

4. Cable according to claim 1, wherein the circumferential groove is located in the region of the offset.

5. Cable according to claim 4, wherein the part of the shield that is folded back over the sleeve is cut to length in the region of the groove.

6. Cable according to claim 1, wherein the part of the shield that is folded back over the sleeve bears against the sleeve at least in the region of the second diameter.

7. Cable according to claim 6, wherein the part of the shield that is folded back over the sleeve, is intermetallically connected to the sleeve in the region of the second diameter.

8. Cable according to claim 1, wherein the part of the shield that is folded back over the sleeve is intermetallically connected to the sleeve at least in the region of the second diameter by means of friction welding, resistance welding or ultrasonic welding.

9. An electrical cable according to claim 1 mounted in a hybrid vehicle or an electric vehicle.

10. Cable according to claim 1, wherein the part of the shield that is folded back over the sleeve is cut to length in the region of the groove.

11. Method for producing an electric cable comprising:
    stripping, at least at one end of the cable, a secondary isolation that surrounds a shield;

pushing a sleeve over the stripped shield, wherein the sleeve has a circumferential radially accessible groove as well as a step-like offset such that the sleeve has a first diameter at a first side and a second, smaller diameter than the first diameter at a second side facing towards the end of the cable;

folding the part of the shield that protrudes beyond the sleeve back over the sleeve at the end of the cable; and intermetallically connecting to the sleeve the part of the shield that is folded back over the sleeve.

12. Method according to claim 11, wherein the shield is intermetallically connected to the sleeve by means of ultrasonic welding or resistance welding.

13. Method according to claim 12, wherein, for the intermetallic connection, an ultrasonic sonotrode or resistance welding electrode and the sleeve are guided around one another along an arc of a circle and/or the part of the shield that is folded back over the sleeve is cut to length by the ultrasonic sonotrode or the resistance welding electrode.

* * * * *